United States Patent
Brown, Jr.

[11] 3,728,942
[45] Apr. 24, 1973

[54] HYDRAULIC BRAKE BOOSTER PRESSURE LIMITING DEVICE

[75] Inventor: Arthur K. Brown, Jr., South Bend, Ind.

[73] Assignee: The Bendix Corporation, South Bend, Ind.

[22] Filed: Jan. 22, 1971

[21] Appl. No.: 108,828

[52] U.S. Cl. ................................. 91/469, 91/391 R
[51] Int. Cl. ...... F15b 13/10, F15b 11/08, F15b 13/04
[58] Field of Search ........................... 91/391 R, 377; 177/625.68, 625.64, 469

[56] References Cited

UNITED STATES PATENTS

| | | | |
|---|---|---|---|
| 2,619,118 | 11/1952 | Adams | 137/625.28 |
| 3,032,065 | 5/1962 | Jolley | 137/625.68 |
| 3,067,773 | 12/1962 | Olander | 137/625.69 |
| 3,625,005 | 12/1971 | Saunders | 91/391 R |
| 3,633,462 | 1/1972 | Goscenski | 91/391 R |
| 2,957,454 | 10/1960 | Stelzer | 91/317 |

FOREIGN PATENTS OR APPLICATIONS

| | | | |
|---|---|---|---|
| 1,105,351 | 3/1968 | Great Britain | 91/391 R |

Primary Examiner—Paul E. Maslousky
Attorney—W. N. Antonis and Plante, Hartz, Smith & Thompson

[57] ABSTRACT

A hydraulic brake booster pressure limiting device for use in a vehicle braking system to prevent booster pressures from becoming great enough to burst brake hoses. When the booster spool valve returns to a normal operating position thus safely restricting the pressure admitted to the boost chamber from the hydraulic pump, operation of the pressure limiting device is suspended so that the booster may modulate to assist the vehicle operator with the brake application.

1 Claim, 3 Drawing Figures

PATENTED APR 24 1973 3,728,942
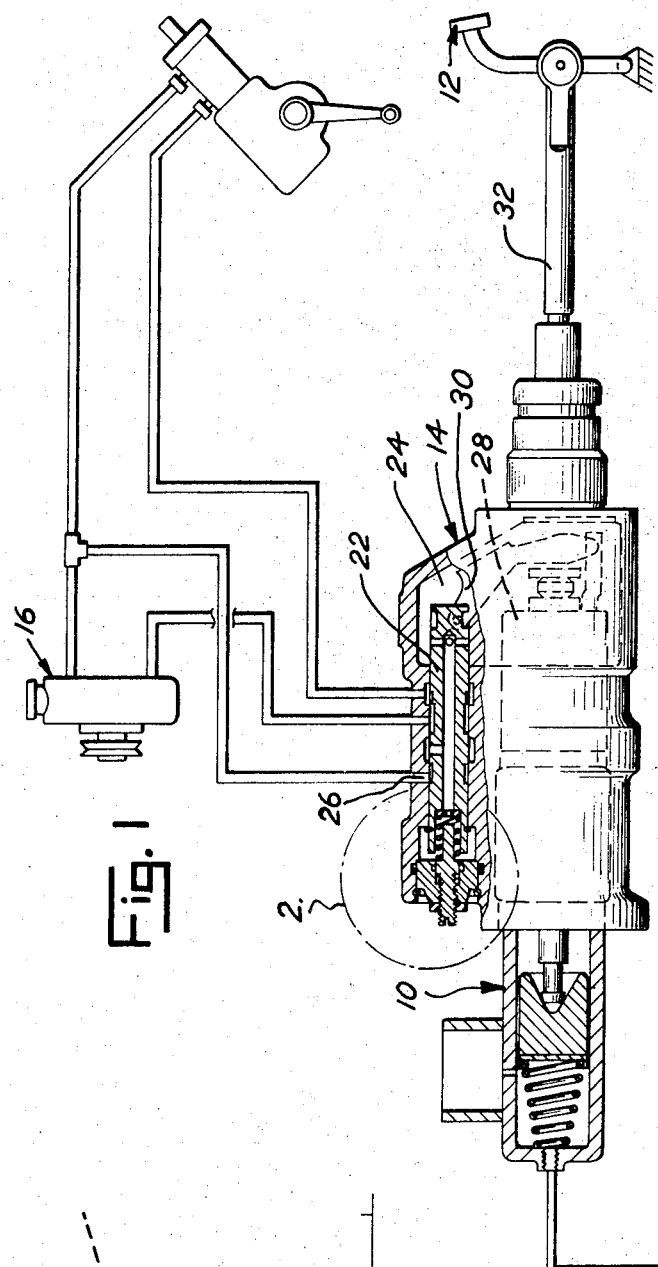
Fig.1
Fig.2
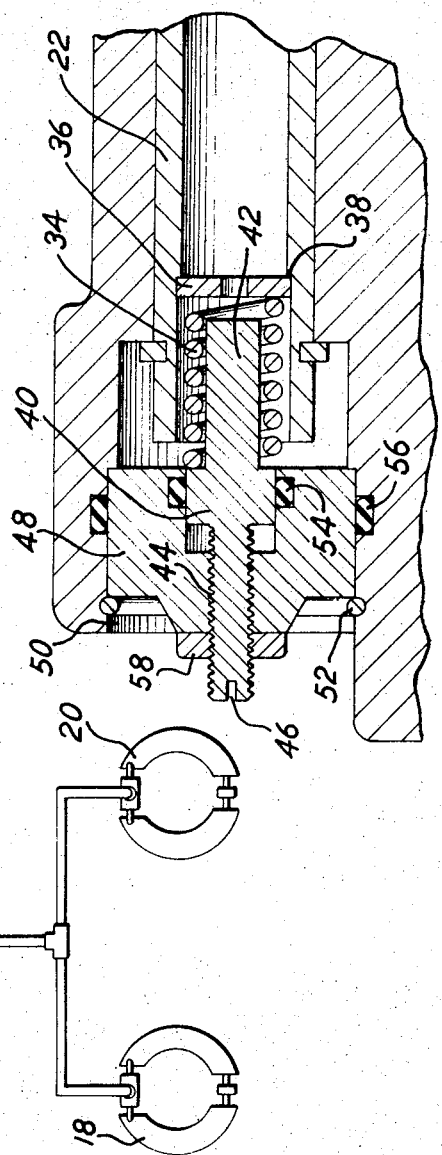
Fig.3
VALVE TRAVEL
BOOSTER CHAMBER PRESSURE
INVENTOR.
ARTHUR K. BROWN JR.
BY
Plante, Hartz, Smith & Thomas
ATTORNEYS

HYDRAULIC BRAKE BOOSTER PRESSURE LIMITING DEVICE

BACKGROUND OF THE INVENTION

This invention relates to hydraulic booster pressure limiting devices for preventing overpressure in the hydraulic booster of a vehicle braking system.

As a consequence of the employment of hydraulic boosters to aid the vehicle operator in his application of the brakes, very high pressures are generated by the system hydraulic pump and admitted to the hydraulic booster chamber which at times could exert such great force on the booster piston that this thrust combined with that of the manual pedal force exerted by the vehicle operator could become great enough to rupture the brake line hoses. In any case upon such an occurrence, the braking fluid, and consequently the braking capability, would be lost.

It is, therefore, desirable to provide a pressure limiting device which when engaged prevents further booster chamber pressure buildup while at the same time refrains from adding another component to the already cluttered engine compartment. This pressure limiting device would not function during normal braking situations and only in a case where the booster pressure was much more than sufficient to completely lock the wheels of the vehicle under ideal braking conditions would the device function to limit the hydraulic booster spool valve travel and thus the amount of hydraulic pressure admitted to the booster chamber from the system hydraulic pump.

SUMMARY OF THE INVENTION

It is an important object of this invention to limit the hydraulic fluid boost pressure which is allowed to operate the brake booster mechanism after a predetermined pressure level is reached regardless of any additional manual force input by the vehicle operator through the brake pedal.

It is another object of this invention to provide a vehicle braking system with a hydraulic booster pressure limiting device which has a minimum of parts coupled with reliable operation and inexpensive, simplified construction.

Still another object is to provide a hydraulic booster pressure limiting device which is a component of the hydraulic booster itself, thereby presenting an integrated, compact assembly no larger and very slightly heavier than a hydraulic booster without the novel pressure limiting device feature.

DESCRIPTION OF THE DRAWINGS

FIG. 1 is a sectional view of a hydraulic booster and its appurtenant braking system components.

FIG. 2 is an enlarged sectional view of the circumscribed portion 2 of FIG. 1.

FIG. 3 is a graph representing the relationship of booster spool travel to booster chamber pressure.

DESCRIPTION OF THE PREFERRED EMBODIMENT

Referring now to FIG. 1, fluid pressure is developed in a master cylinder 10 by operation of a pedal 12 through, and with the assistance of, a hydraulic brake booster 14 which derives its motive power from hydraulic fluid under pressure from pump 16. Master cylinder 10 could be either of the single or split system type for actuating front and rear braking systems 18 and 20 respectively. During a normal brake application, a spool valve 22 regulates the boost chamber 24 pressure and thus the magnitude of hydraulic boost assistance by slidably opening and restricting fluid return port 26. The pressure then acts on booster piston 28 to assist the operator with the brake application. Lever arm 30 transmits linear motion of the pushrod 32 to the spool valve 22, which in turn causes boost chamber pressure to vary according to the illustrative graph shown by FIG. 3. The hydraulic booster device itself forms no part of the present invention and may be of any well known type such as that shown in copending U. S. application Ser. No. 35,800 filed May 8, 1970 now U.S. Pat. No. 3,625,005, owned by the assignee of the present invention, and incorporated herein by reference as necessary for a more complete understanding of the present invention.

Referring now to FIG. 2, it will be seen that spool return spring 34 presses against washer 36 which in turn is engaged by shoulder 38 for resiliently urging spool valve 22 to the right, as viewed in FIG. 2, whenever no hydraulic boost assistance is needed. In this position, fluid return port 26 is fully open so that there is no pressure buildup in boost chamber 24 from pump 16. Adjusting stud 40 has a projection 42 for engagement with spool valve 22 at washer 36 whenever spool travel in the direction admitting increased hydraulic pressure (to the left as viewed in FIG. 2) reaches a predetermined limit. Threads 44 provide for axial positioning of the adjusting stud by rotation of the stud utilizing slot 46. Gland 48 is retained in bore 50 by a suitable retainer 52. It both operatively carries the adjusting stud 40 and, using suitable seals 54 and 56, isolates the hydraulic booster from contaminants, and prevents the escape of hydraulic fluid from the booster. Lock nut 58 enables the preselected position of the adjusting stud 40 to be maintained.

MODE OF OPERATION OF THE PREFERRED EMBODIMENT

If there is no extreme closure of fluid return port 26 by spool valve 22, indicating booster chamber 24 overpressure, the spool valve 22 will be resiliently positioned against spool return spring 34 and will modulate the opening of fluid return port 26 which regulates boost chamber 24 fluid pressure. Thus, hydraulic fluid pressure from pump 16 is admitted to the boost chamber 24 which then in turn exerts a force on the booster piston 28 to assist the vehicle operator in applying the brakes.

However, when the travel of the spool valve 22 reaches a predetermined point in the direction admitting increased fluid pressure from pump 16, (to the left as viewed in FIGS. 1 and 2) it is stopped by projection 42 contacting washer 36. This travel limitation at some predetermined point, effectively limits booster chamber 24 pressure by preventing further restriction of fluid return port 26, and thus the boost assistance which is given the vehicle operator, to a level which will not rupture the brake line hoses or cause other braking system damage. The predetermined travel limit would be established at a point which would admit boost pressure from pump 16 well in excess of that required to lock the wheel of the vehicle under ideal braking conditions.

Adjustment of the predetermined valve travel limit point is accomplished by rotating adjusting stud 40 clockwise; when viewed from its slotted end, for a shorter travel limit resulting in lower maximum boost chamber 24 pressure or; counterclockwise when viewed from its slotted end for a longer travel distance to the left as viewed in FIGS. 1 and 2, resulting in a higher maximum boost chamber 24 pressure. Lock nut 58 retains adjusting stud 46 at the predetermined setting when tightened clockwise, as viewed from the slotted end of adjusting stud 46, against gland 48. Removal of retainer 52 would allow disassembly of the pressure limiting device as a unit for inspection, repair or maintenance whenever necessary.

I claim:

1. In a hydraulic brake booster:

a housing defining a pressure chamber therewithin;

a piston slidably mounted in said pressure chamber;

valve means within said housing for controlling fluid communication between said chamber, a fluid pressure source, and a fluid reservoir;

operator-actuated means within said housing for shifting said valve means from a first position venting said pressure chamber to said reservoir to a second position, said valve means communicating progressively higher fluid pressure levels from said pressure source into said chamber as the valve means is shifted toward said second position; and manually adjustable stop means within said housing to limit movement of the spool valve thereby limiting the fluid pressure level in said pressure chamber to a predetermined value;

said housing defining a bore therewithin;

said valve means being a spool valve slidably mounted in said bore;

said stop means engaging the end of said spool valve as the latter is shifted in said bore to limit maximum movement of said spool valve;

said housing having a threaded opening extending through the end of said bore;

said stop means being a threaded stud extending through said opening;

the threads on the stud engaging the threads on the wall of said opening to perit the distance the stud projects into said housing to be changed from the exterior of the latter;

the end of said stud being adapted to engage the end of said spool valve whereby movement of the spool valve past said end of the stud is prevented;

said stop means including locking means for retaining the stop means in said position;

said housing defining a second bore therewithin coaxial with said bore, and with a different diameter than said bore;

said second bore having a plug located therein for operatively carrying said adjusting means, stop means and locking means and having sealing means for preventing contaminants from entering, and hydraulic fluid loss from said booster.

* * * * *